US012617878B2

(12) United States Patent
Chino et al.

(10) Patent No.: US 12,617,878 B2
(45) Date of Patent: May 5, 2026

(54) SULFUR-CONTAINING UNSATURATED HYDROCARBON POLYMER AND METHOD FOR PRODUCTION THEREOF, ADDITIVE FOR RUBBER, RUBBER COMPOSITION, AND TIRE

(71) Applicant: ENEOS Corporation, Tokyo (JP)

(72) Inventors: Keisuke Chino, Tokyo (JP); Yusuke Matsuo, Tokyo (JP); Makoto Ashiura, Tokyo (JP)

(73) Assignee: ENEOS Materials Corporation, Tokyo (JP)

( * ) Notice: Subject to any disclaimer, the term of this patent is extended or adjusted under 35 U.S.C. 154(b) by 690 days.

(21) Appl. No.: 17/637,214

(22) PCT Filed: Aug. 20, 2020

(86) PCT No.: PCT/JP2020/031467
§ 371 (c)(1),
(2) Date: Feb. 22, 2022

(87) PCT Pub. No.: WO2021/033747
PCT Pub. Date: Feb. 25, 2021

(65) Prior Publication Data
US 2022/0298275 A1 Sep. 22, 2022

(30) Foreign Application Priority Data
Aug. 22, 2019 (JP) ................................. 2019-152173

(51) Int. Cl.
*C08F 32/08* (2006.01)
*B60C 1/00* (2006.01)
*C08L 9/06* (2006.01)

(52) U.S. Cl.
CPC ............ *C08F 32/08* (2013.01); *B60C 1/0016* (2013.01); *C08L 9/06* (2013.01)

(58) Field of Classification Search
CPC ............ C08F 8/34; C08F 36/20; C08C 19/20
See application file for complete search history.

(56) References Cited

U.S. PATENT DOCUMENTS

| | | | | |
|---|---|---|---|---|
| 4,209,596 A | * | 6/1980 | Hashimoto | ............... C08K 3/22 |
| | | | | 525/379 |
| 4,244,843 A | | 1/1981 | Hashimoto et al. | |
| 4,581,400 A | * | 4/1986 | Kondo | .................... C08L 21/00 |
| | | | | 524/270 |
| 4,740,559 A | | 4/1988 | Johansson et al. | |
| 2016/0376426 A1 | * | 12/2016 | Kimura | ..................... C08L 7/00 |
| | | | | 524/518 |
| 2019/0176520 A1 | | 6/2019 | Takenaka | |

FOREIGN PATENT DOCUMENTS

| | | | |
|---|---|---|---|
| CA | 1171189 | * | 7/1984 |
| CN | 102120835 | * | 7/2011 |
| CN | 102964646 | * | 3/2013 |
| CN | 104927005 | A | 9/2015 |
| JP | S50-000033 | A | 1/1975 |
| JP | S50-110444 | A | 8/1975 |
| JP | S61-148249 | A | 7/1986 |
| JP | S62-084133 | A | 4/1987 |
| JP | 63-301244 | * | 12/1988 |
| JP | S63-301244 | A | 12/1988 |
| JP | H02-215802 | A | 8/1990 |
| JP | H03-237104 | A | 10/1991 |
| JP | 2004-083679 | A | 3/2004 |
| JP | 2017-203111 | A | 11/2017 |
| WO | WO 2011/038539 | A1 | 4/2011 |
| WO | WO 2018/189878 | A1 | 10/2018 |

OTHER PUBLICATIONS

Kujimoto, Rubber Chemistry and Technology (1970) 43 (2): 411-423 (Year: 1970).*
Translation of JP 63-301244 (Year: 1988).*
Translation of CN 102120835 (Year: 2011).*
Translation of CN 102964646 (Year: 2013).*
Japan Patent Office, Notice of Reasons for Refusal in Japanese Patent Application No. 2019-152173 (Dec. 20, 2022).
The International Bureau of WIPO, International Preliminary Report on Patentability in International Patent Application No. PCT/JP2020/031467 (Feb. 17, 2022).
Dow Chemical Company, "Technical Information: NORDEL™ IP 5565 Hydrocarbon Rubber," [accessed at https://www.cheminno.co.th/wp-content/uploads/2018/file/dow/NORDEL/TDS-NORDEL-5565.pdf] (2012).
Oliveira et al., "Mercapto-modified Copolymers in Polymer Blends, 1. Functionalization of EPDM with Mercapto Groups and Its Use in NBR/EPDM Blends," *Macromol. Rapid Commun.*, 20(10): 526-531 (1999).
Sirqueira et al., "The Effect of Mercapto- and Thioacetate-modified EPDM on the Curing Parameters and Mechanical Properties of Natural Rubber/EPDM Blends," *European Polymer Journal*, 39(12): 2283-2290 (2003).
European Patent Office, Extended European Search Report in European Patent Office Application No. 20855288.5 (Aug. 23, 2023).
Japanese Patent Office, International Search Report in International Patent Application No. PCT/JP2020/031467 (Nov. 2, 2020).
China National Intellectual Property Administration, Office Action in Chinese Patent Application No. 202080058628.0 (Mar. 16, 2023).
Japan Patent Office, Office Action in Japanese Patent Application No. 2019-152173 (Apr. 25, 2023).

* cited by examiner

*Primary Examiner* — Robert C Boyle
(74) *Attorney, Agent, or Firm* — Leydig, Voit & Mayer, Ltd.

(57) ABSTRACT

Provided is a sulfur-containing unsaturated hydrocarbon polymer which can improve wet grip performance and fuel efficiency of a tire in a well-balanced manner by being blended into a rubber composition for a tire. A sulfur-containing unsaturated hydrocarbon polymer of the present invention is a reaction product obtained by reacting sulfur with an unsaturated bond in a polymer of an unsaturated hydrocarbon.

14 Claims, 1 Drawing Sheet

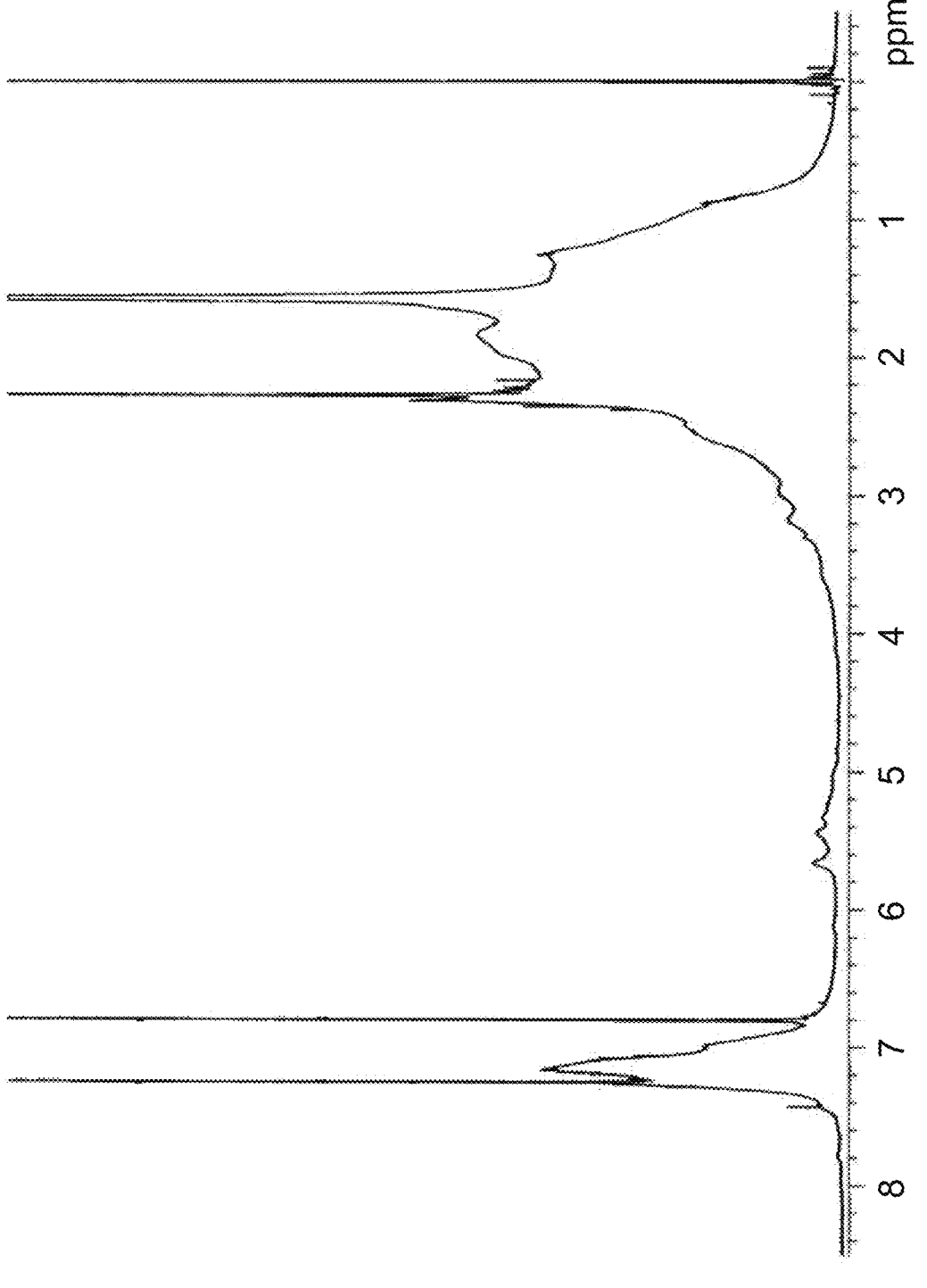

1

SULFUR-CONTAINING UNSATURATED HYDROCARBON POLYMER AND METHOD FOR PRODUCTION THEREOF, ADDITIVE FOR RUBBER, RUBBER COMPOSITION, AND TIRE

BACKGROUND OF THE INVENTION

Field of the Invention

The present invention relates to a sulfur-containing unsaturated hydrocarbon polymer and a method for producing the same. The present invention also relates to an additive for rubber comprising the sulfur-containing unsaturated hydrocarbon polymer, a rubber composition comprising the additive for rubber, and a tire produced using the rubber composition.

Background Art

Conventionally, tires have been manufactured using a vulcanized rubber in which a vulcanizing agent such as sulfur is added to a rubber component as a raw material. For example, when insoluble sulfur is used as a vulcanizing agent, it is possible to suppress blooming in which insoluble sulfur migrates to the rubber surface and precipitates in the vulcanization step. However, on the other hand, affinity with the rubber is low and dispersibility is poor. To solve such problem, it has been proposed to use a vulcanizing agent composition comprising insoluble sulfur and a dicyclopentadiene resin (see Patent Document 1). It has also been proposed to use a reaction product of sulfur and dicyclopentadiene alone as a vulcanizing agent (see Patent Document 2).

Further, in recent years, regulations on exhaust gas such as carbon dioxide have become severe and demands for fuel efficiency improvement for automobiles have extremely increased from the viewpoints of resource conservation, energy saving, and environmental protection. Therefore, it is required to improve fuel efficiency by improving the rolling resistance of the tires. It is also required to improve the grip performance (wet grip performance) of the tires when the road surface is wet. However, the vulcanizing agent compositions described in Patent Documents 1 and 2 do not improve the performance of these tires. Therefore, there is a need for an additive capable of improving the performance of these tires.

PRIOR ART DOCUMENTS

Patent Documents

[Patent Document 1] WO2018/189878
[Patent Document 2] Japanese Patent Application Laid-Open Publication No. S62-84133

SUMMARY OF THE INVENTION

Problems to be Solved by the Invention

The present inventors have conducted intensive studies in order to solve the above problems and as a result have developed a sulfur-containing unsaturated hydrocarbon polymer which is a reaction product obtained by reacting sulfur with an unsaturated bond of a polymer of an unsaturated hydrocarbon, and have found that by adding the sulfur-containing unsaturated hydrocarbon polymer to a rubber composition for a tire, it is possible to improve wet grip performance and fuel efficiency of the tire in a well-balanced manner, thereby completing the present invention.

That is, according to the present invention, the following inventions are provided.

[1] A sulfur-containing unsaturated hydrocarbon polymer, being a reaction product obtained by reacting sulfur with an unsaturated bond of a polymer of an unsaturated hydrocarbon.

[2] The sulfur-containing unsaturated hydrocarbon polymer according to [1], wherein the unsaturated hydrocarbon comprises an alicyclic unsaturated compound.

[3] The sulfur-containing unsaturated hydrocarbon polymer according to [2], wherein the alicyclic unsaturated compound comprises a compound having a norbornene skeleton.

[4] The sulfur-containing unsaturated hydrocarbon polymer according to [3], wherein the compound having a norbornene skeleton comprises dicyclopentadiene.

[5] The sulfur-containing unsaturated hydrocarbon polymer according to [3] or [4], wherein only an unsaturated bond in the norbornene skeleton reacts with sulfur.

[6] A method for producing a sulfur-containing unsaturated hydrocarbon polymer, comprising the step of reacting sulfur with a polymer of unsaturated hydrocarbon.

[7] The method for producing a sulfur-containing unsaturated hydrocarbon polymer according to [6], wherein the unsaturated hydrocarbon comprises an alicyclic unsaturated compound.

[8] An additive for rubber comprising the sulfur-containing unsaturated hydrocarbon polymer according to any one of [1] to [5].

[9] The additive for rubber according to [8], being an agent for improving viscoelastic property of a tire.

[10] The additive for rubber according to [8], being an agent for improving cut chip resistance of a tire.

[11] A rubber composition comprising the additive for rubber according to any one of [8] to [10] and a rubber component.

[12] The rubber composition according to [11], for use in a tire.

[13] A tire produced by using the rubber composition according to [11] or [12].

Effect of the Invention

It is possible to improve wet grip performance and fuel efficiency of a tire in a well-balanced manner by adding a sulfur-containing unsaturated hydrocarbon polymer of the present invention to a rubber composition for a tire.

BRIEF DESCRIPTION OF THE DRAWINGS

FIG. 1 shows a ${}^{1}$H-NMR chart of Sulfur-containing unsaturated hydrocarbon polymer A synthesized in Preparation Example 1.

MODE FOR CARRYING OUT THE INVENTION

[Sulfur-Containing Unsaturated Hydrocarbon Polymer]

The sulfur-containing unsaturated hydrocarbon polymer of the present invention is a reaction product obtained by reacting sulfur with an unsaturated bond of a polymer of an unsaturated hydrocarbon.

In the present invention, at least a hydrocarbon having an unsaturated bond for reacting with sulfur is used as a raw material of the polymer. The hydrocarbon having an unsaturated bond is preferably an alicyclic unsaturated compound and more preferably a compound having a norbornene skeleton.

In one embodiment of the present invention, a resin obtained by thermally decomposing naphtha to remove useful compounds such as ethylene, propylene and butadiene and polymerizing the remaining fraction in a mixed state (hereinafter referred to as "petroleum resin") can be used as a polymer of an unsaturated hydrocarbon from the viewpoint of industrial production. Examples of the petroleum resin include an aliphatic petroleum resin (C5 petroleum resin) obtained by (co)polymerizing a C5 fraction, an aromatic petroleum resin (C9 petroleum resin) obtained by (co) polymerizing a C9 fraction obtained by thermally decomposing naphtha, and a co-polymerized petroleum resin (C5/ C9 petroleum resin) obtained by co-polymerizing the C5 fraction and the C9 fraction. It should be noted that with respect to the petroleum resins, the properties of the obtained resins differ depending on the composition ratio of the olefin fraction of the raw material, but they are transparent, light yellow to yellowish brown-coloured pine resins having a molecular weight of 200 to 8000 and a softening point of 5 to 180° C.

In the present invention, it is preferable to use a petroleum resin obtained by (co)polymerizing a fraction comprising an alicyclic unsaturated compound (hereinafter referred to as an "alicyclic unsaturated compound-containing petroleum resin") among the petroleum resins. The alicyclic unsaturated compound-containing petroleum resin includes, for example, a resin obtained by dimerizing cyclopentadienes contained in a C5 fraction to give dicyclopentadienes and polymerizing by means of Diels-Alder reaction by heating the product separated from the other C5 fraction by distillation. Examples of the cyclopentadienes include cyclopentadiene, methylcyclopentadiene, and the like. Examples of the dicyclopentadienes include dicyclopentadiene (DCPD), methyldicyclopentadiene, and the like, and especially preferred is dicyclopentadiene.

The alicyclic unsaturated compound-containing petroleum resin may contain, as a fraction, a C5 fraction or a C9 fraction other than cyclopentadienes.

Generally, as the C5 fraction is used a fraction having a boiling point range of about 20 to 110° C. of the boiling point range obtained by thermal decomposition of petroleum. Examples of the C5 fraction other than cyclopentadienes include olefinic hydrocarbons such as 1-pentene, 2-pentene, 2-methyl-1-butene, 2-methyl-2-butene, and 3-methyl-1-butene, and diolefinic hydrocarbons such as 2-methyl-1,3-butadiene, 1,2-pentadiene, 1,3-pentadiene, and 3-methyl-1,2-butadiene.

Generally used as the C9 fraction is a fraction having a boiling point in the range of about 100° C. to 280° C. among fractions having a boiling point in the range obtained by thermal decomposition of petroleum. Examples of the C9 fraction include styrene homologues such as α-methylstyrene, β-methylstyrene, and γ-methylstyrene, and indene and its homologues homologs such as coumarone.

A method for producing a general C5 petroleum resin, a C9-based petroleum resin and a C5/C9 petroleum resin comprises adding 0.01 to 5% by weight of a Friedel-Crafts type catalyst to raw oil, decomposing and removing the catalyst using alkali after completion of the reaction, and finally removing unreacted oil and a low molecular weight polymer by distillation or the like, then obtaining a product. Generally, examples of the Friedel-Crafts type catalyst include aluminum trichloride, aluminum tribromide, boron trifluoride or a phenol complex thereof, a butanol complex, and the like. Preferred among these are aluminum trichloride, a phenol complex of boron trifluoride, and a butanol complex of boron trifluoride. The polymerization temperature is preferably 0 to 100° C. and especially preferably 0 to 80° C. The amount of catalyst and the polymerization time are preferably in the range of 0.1 to 10 hours with 0.1 to 2.0 parts by mass of the catalyst per 100 parts by mass of the raw oil. The reaction pressure is preferably in the range of atmospheric pressure to 1 MPa.

The petroleum resin may be partially polymerized with a compound having various functional groups. Examples of the functional groups include an alcohol compound and a phenol compound having a hydroxyl group. Specific examples of the alcohol compound include alcohol compounds having a double bond such as allyl alcohol and 2-butene-1,4-diol. As the phenolic compound, alkylphenols such as phenol, cresol, xylenol, p-t-butylphenol, p-octylphenol and p-nonylphenol can be used. These compounds having a hydroxyl group may be used alone or in combination of two or more of thereof.

The hydroxyl group-containing petroleum resin can also be produced by a method in which an ester group in the petroleum resin is introduced by thermal polymerization of (meth)acrylic acid alkyl ester or the like together with the petroleum fraction and then the ester group is reduced, or a method in which the double bond in the petroleum resin remains or is introduced, and then the double bond is hydrated. In the present invention, those obtained by various methods as described above can be used as the hydroxyl group-containing petroleum resin, but from the viewpoint of performance and production, it is preferable to use a phenol-modified petroleum resin or the like.

The phenol-modified petroleum resin is obtained by cationic polymerization of a C9 fraction in the presence of phenol, and can be easily modified.

The polymerization method can be selected from thermal polymerization in which heating is carried out at about 150° C. to about 300° C. for about 1 to 10 hours with a focus on the above-mentioned Diels-Alder reaction or a Friedel-Crafts type reaction as described above.

For these resins described above, it is preferable to use a resin having a softening point of 200° C. or less (measurement method: ASTM E28-58-T), and further preferably 45 to 160° C.

In the present invention, it is also possible to use partially hydrogenated petroleum resins obtained by partially hydrogenating the above-mentioned petroleum resins. Although the conditions for hydrogenation are optional, the reaction is carried out under the conditions of reaction temperature of 150 to 320° C., reaction pressure of 30 to 300 Kg/cm$^2$ and reaction time of 1 to 10 hours by mixing the petroleum resin with one or more solvents selected from saturated hydrocarbons, saturated cyclic hydrocarbons and aromatic hydrocarbons having a boiling point of substantially 140 to 280° C. at normal pressure, and using a general hydrogenation catalyst comprising nickel, molybdenum, cobalt, palladium, platinum and the like.

Commercially available products that can be used include NEORESIN EP-140 (softening point: 140° C.), manufactured by JXTG Energy Co., Ltd., MARCAREZ M-890A (softening point: 105° C.), manufactured by Maruzen Petrochemical Co., Ltd., MARCAREZ M-845A (softening point: 145° C.), manufactured by Maruzen Petrochemical Co., Ltd., T-REZ RB093 (softening point: 92° C.), manufactured by JXTG Energy Co., Ltd., T-REZ RB100 (softening point: 98° C.), manufactured by JXTG Energy Co., Ltd., T-REZ RC093 (softening point: 93° C.), manufactured by JXTG Energy Co., Ltd., T-REZ RC100 (softening point: 97° C.), manufactured by JXTG Energy Co., Ltd., T-REZ RC115 (softening point: 112° C.), manufactured by JXTG Energy Co., Ltd., T-REZ RD104 (softening point: 102° C.), manufactured by JXTG Energy Co., Ltd., T-REZ PR802 (softening point: 89° C.), manufactured by JXTG Energy Co., Ltd., Quintone B170 (softening point: 70° C.), manufactured by ZEON CORPORATION, Quintone M100 (softening point: 95° C.), manufactured by ZEON CORPORATION, Quintone R100 (softening point: 96° C.), manufactured by ZEON CORPORATION, Quintone A100 (softening point: 100° C.), manufactured by Zeon Corporation, Quintone RX110 (softening point: 110° C.), manufactured by ZEON CORPORATION, Escorez 1102 (softening point: 100° C.), manufactured by Exxon Mobil Chemical, Escorez 1304 (softening point: 94° C.), manufactured by Exxon Mobil Chemical, Escorez 1310 LC (softening point: 100° C.), manufactured by Exxon Mobil Chemical, Escorez 1315 (softening point: 115° C.), manufactured by Exxon Mobil Chemical, HIKOREZ A-1100 (softening point: 98° C.), manufactured by KOLON Industries, HIKOREZ A-1115 (softening point: 112° C.), manufactured by KOLON Industries, HIKOREZ A-2115 (softening point: 112° C.), manufactured by KOLON Industries, and HIKOREZ C-1100 (softening point: 98° C.), manufactured by KOLON Industries.

(Method for Producing Sulfur-Containing Unsaturated Hydrocarbon Polymer)

The sulfur-containing unsaturated hydrocarbon polymer can be obtained by reacting sulfur with the above-mentioned petroleum resin by heating reaction in an appropriate solvent. Examples of the solvent include conventionally known organic solvents, aroma oils, petroleum resins and the like. When a petroleum resin is used, a saturated hydrocarbon petroleum resin obtained by hydrogenating the above-mentioned unsaturated hydrocarbon petroleum resin is preferable, and a saturated DCPD/C9 resin is more preferable. The conditions for the heating reaction can be appropriately set depending on the type of the petroleum resin and the solvent, and can be carried out at 80 to 230° C., preferably 100 to 200° C. The reaction product thus obtained may be used after purification or may be directly incorporated into the rubber composition.

The amount of sulfur added to the petroleum resin is not particularly limited, but is preferably at least 0.1 equivalent, preferably 0.3 to 5 equivalents per unsaturated bond (double bond) of the unsaturated hydrocarbon.

In the present invention, it is preferable to use a compound having a norbornene skeleton, particularly dicyclopentadiene, as an unsaturated alicyclic hydrocarbon. In addition, it is preferable that only the double bond on the norbornene skeleton of dicyclopentadiene reacts with sulfur. It can be confirmed by $^1$H-NMR that the double bond on the norbornene skeleton reacts with sulfur and is consumed.

The weight average molecular weight (Mw) of the obtained sulfur-containing unsaturated hydrocarbon polymer is preferably 500 to 8000, and more preferably 1000 to 5000. The molecular weight distribution (Mw/Mn) is preferably 1 to 5, and more preferably 1.2 to 4. The weight average molecular weight (Mw) and the molecular weight distribution (Mw/Mn) can be measured by a conventionally known method of GPC (gel permeation chromatography) analysis.

[Additive for Rubber]

An additive for rubber of the present invention comprises the above-mentioned sulfur-containing unsaturated hydrocarbon polymer. The sulfur-containing unsaturated hydrocarbon polymer is as described above. When the sulfur-containing unsaturated hydrocarbon polymer is added to the rubber composition for a tire, it is possible to improve the viscoelastic properties (wet grip property performance and fuel efficiency) of the tire in a well-balanced manner. Therefore, the sulfur-containing unsaturated hydrocarbon polymer can be used as an agent for improving the viscoelastic properties of the tire.

It is known that when a hydrocarbon polymer is added to a rubber composition for a tire, the glass transition point (tan $\delta$ (0° C.) in the measurement of viscoelastic properties in the following examples) increases, thereby improving wet grip performance of the tire, while reducing fuel efficiency (tan $\delta$ (60° C.) in the measurement of viscoelastic properties in the following examples). That is, the wet grip performance and the fuel efficiency of the tire are in a trade-off relationship, and it has been difficult to improve both in a good balance. This may be due to increased energy absorption due to increased entanglement. On the other hand, in the case of the sulfur-containing hydrocarbon polymer, it is possible to improve wet grip performance without significantly lowering the fuel efficiency. This is considered to be because the motion of the entanglement is suppressed by the sulfur portion binding to the rubber.

The additive for rubber of the present invention can improve cut chip resistance of a tire by being incorporated into the rubber composition for a tire (increase in 100% modulus [MPa] and 300% modulus [MPa] in tensile strength measurement of the following examples). Cut chip is a phenomenon in which a mass larger than normal abrasion powder falls off from the tread and side portion of the tire when the tire is running. Therefore, the sulfur-containing unsaturated hydrocarbon polymer can be used as an agent for improving cut-chip resistance of the tire.

[Rubber Composition]

The rubber composition of the present invention contains the above-mentioned additive for rubber and a rubber component. The additive for rubber is as described above. The amount of the additive for rubber is preferably 1 to 30 parts by mass, more preferably 3 to 20 parts by mass, with respect to 100 parts by mass of the rubber component.

(Rubber Component)

The rubber component preferably includes a diene rubber without particular limitation. The sulfur-containing unsaturated hydrocarbon polymer is more reactive to diene rubber and more reactive to rubber molecular chains than an unsaturated petroleum resin (free of sulfur) which is a general unsaturated hydrocarbon polymer. Therefore, it is possible to improve wet grip property performance and fuel efficiency of the tire in a well-balanced manner by using a diene rubber.

As the rubber component, a non-diene rubber may be blended in addition to the diene rubber.

The content of the diene rubber in the rubber component is preferably 10% by mass or more, more preferably 30% by mass or more, and further preferably 50% by mass.

Examples of the diene rubber include natural rubber (NR), styrene-butadiene copolymer rubber (SBR), butadiene rubber (BR), isoprene rubber (IR), nitrile rubber (NBR), chloroprene rubber (CR), ethylene-propylene-diene terpolymer rubber (EPDM), butyl rubber (IIR), and modified diene rubbers thereof. The modified diene rubber includes diene rubbers modified by modification methods such as main chain modification, single terminal modification, double terminal modification, and hydrogenation. Examples of the modified functional group of the modified synthetic diene rubber includes various functional groups such as an epoxy group, an amino group, an alkoxysilyl group, and a hydroxyl group, and one or two or more of these functional groups may be contained in the modified synthetic diene rubber.

The method for producing the diene rubber is not particularly limited, and examples thereof include emulsion polymerization, solution polymerization, radical polymerization, anionic polymerization, and cationic polymerization. The glass transition point is not particularly limited.

Examples of natural rubber include natural rubber latex, technical grade rubber (TSR), smoked sheet (RSS), guttapercha, natural rubber derived from *Eucommia ulmoides*, natural rubber derived from *Parthenium argentatum*, natural rubber derived from Russian dandelion, fermented rubber of plant components and the like, and also included in the natural rubber are natural rubbers obtained by modification of these such as epoxidized natural rubber, methacrylic acid modified natural rubber, styrene modified natural rubber, sulfonic acid modified natural rubber, zinc sulfonate modified natural rubber and the like.

The ratio of cis/trans/vinyl in the double bond portion of the natural rubber and the synthetic diene rubber is not particularly limited, and they can be suitably used in any ratio. The number average molecular weight and molecular weight distribution of the diene rubber are not particularly limited, and the number average molecular weight is preferably 500 to 3000000 and the molecular weight distribution is preferably 1.5 to 15.

As the non-diene rubber, those commonly known can be widely used. Specific examples include olefin rubbers such as ethylene-propylene rubber (EPM), chlorosulfonated polyethylene rubber (CSM), acrylic rubber (ACM), urethane rubber (U), silicone rubber (VMQ, PVMQ, FVMQ), fluoro rubber (FKM), and polysulfide rubber (T).

In the rubber composition of the present invention, an elastomer may be added in addition to the above-mentioned rubber components to the extent that the function thereof is not impaired. Examples of the elastomer include thermoplastic elastomers selected from the group consisting of polystyrene elastomeric polymers such as styrene-isoprene-styrene ternary block copolymer (SIS), styrene-butadiene-styrene ternary block copolymer (SBS), and hydrogenated products thereof (SEBS, SEPS, SEEPS), polyolefin elastomers, polyvinyl chloride elastomers, polyurethane elastomers, polyester elastomers, and polyamide elastomers.

(Other Processing Aids)

The rubber composition of the present invention may contain other processing aids such as silane coupling agents, vulcanizing agents, vulcanization accelerators, vulcanization accelerating aids, anti-aging agents, softening agents, antioxidants, fillers and plasticizers, within the scope of the function thereof is not impaired.

When silica is added, it is preferable to add a silane coupling agent. As the silane coupling agent, well-known silane coupling agents can be used, and examples thereof include bis[3-(triethoxysilyl)propyl]tetrasulfide, bis[3-(triethoxysilyl)propyl]disulfide, 3-octanoylthio-1-propyltriethoxysilane, and a single condensate thereof or a cocondensate thereof with 3-mercaptopropyltriethoxysilane. As the bis[3-(triethoxysilyl)propyl]tetrasulfide, a commercially available one may be used, for example, Si-69 manufactured by Evonik may be used. As the bis[3-(triethoxysilyl)propyl] disulfide, a commercially available one may be used, for example, Si-75 manufactured by Evonik. As the 3-octanoylthio-1-propyltriethoxysilane, a commercially available one may be used, for example, NXT silane manufactured by Momentive. As the condensate of 3-octanoylthio-1-propyltriethoxysilane, a commercially available one may be used, for example, NXT Z45 silane manufactured by Momentive. The amount of the silane coupling agent is preferably 1 to 20% by mass, more preferably 2 to 10% by mass of the amount of silica.

Examples of the vulcanizing agent include sulfur-based vulcanizing agents such as powdered sulfur, precipitated sulfur, highly dispersible sulfur, surface-treated sulfur, insoluble sulfur, dimorpholine disulfide, and alkylphenol disulfide, and zinc oxide, magnesium oxide, litharge, p-quinonedioxime, p-dibenzoylquinonedioxime, tetrachloro-p-benzoquinone, poly-p-dinitrobenzene, methylenedianiline, phenol resin, brominated alkylphenol resin, chlorinated alkylphenol resin and the like. The content of the vulcanizing agent is preferably 0.1 to 10 parts by mass, more preferably 1 to 5 parts by mass, with respect to 100 parts by mass of the rubber component.

Examples of vulcanizing accelerator include thiuram-based such as tetramethylthiuram disulfide (TMTD), tetraethylthiuram disulfide (TETD), and tetramethylthiuram monosulfide (TMTM); aldehyde ammonia systems such as hexamethylenetetramine; guanidine systems such as diphenylguanidine (DPG); thiazole systems such as 2-mercaptobenzothiazole (MBT) and dibenzothiazyl disulfide (DM); sulfenamide systems such as N-cyclohexyl-2-benzothiazylsulphene amide (CBS) and N-t-butyl-2-benzothiazyl sulphene amide (BBS); and dithiocarbamates such as dimethyldithiocarbamate (ZnPDC). The content of the vulcanization accelerator is preferably 0.1 to 10 parts by mass, more preferably 1 to 5 parts by mass, with respect to 100 parts by mass of the rubber component.

Examples of the vulcanization accelerating aid include fatty acids such as acetyl acid, propionic acid, butanoic acid, stearic acid, acrylic acid, and maleic acid, zinc acetyl acid, zinc propionate, zinc butanoate, zinc stearate, zinc acrylate, zinc maleate, and zinc oxide. The amount of the vulcanization accelerating aid is preferably from 0.1 to 10 parts by mass, more preferably from 1 to 5 parts by mass, with respect to 100 parts by mass of the rubber component.

Examples of the antioxidant include compounds such as aliphatic and aromatic hindered amine compounds and hindered phenol compounds. The amount of the antioxidant to be blended is preferably 0.1 to 10 parts by mass, more preferably 1 to 5 parts by mass, with respect to 100 parts by mass of the rubber component.

Examples of the antioxidant include butyl hydroxytoluene (BHT), butyl hydroxyanisole (BHA), and the like. The amount of the antioxidant to be added is preferably 0.1 to 10 parts by mass, more preferably 1 to 5 parts by mass per 100 parts by mass of the rubber component.

As for the softening agents, those conventionally known can be used, including but not limited to, petroleum-containing softening agents such as an aroma oil, paraffin oil and naphthene oil, and plant-containing softening agents such as a palm oil, castor oil, cottonseed oil and soybean oil. When in use, one or two or more thereof may be appropriately selected and used. When a softening agent is contained, it is preferable that use is made to those from the above-mentioned softening agent which are liquid at room temperature such as 25° C., for example, petroleum softening agents such as an aroma oil, paraffin oil, and naphthene oil, and especially preferably aroma oil from the viewpoint of ease of handling. As the aroma oil, T-DAE (Treated-Distilled Aromatic Extracts: used as a petroleum-derived rubber softening agent, and can be obtained as an extract fraction obtained by solvent extraction of reduced pressure light oil of crude oil. In order to reduce polynuclear aromatic compounds with high carcinogenicity, treatment such as twice of solvent extraction is performed) is used, and in addition, A/O (Asphalt/Oil) mix and NC-RAE (Residual Aromatic Extracts) are used. The amount of the softening agent is preferably 10 to 200 parts by mass, more preferably 20 to 100 parts by mass with respect to 100 parts by mass of the rubber component.

Examples of the filler include silica, barium sulfate and the like, and silica is preferably used. The amount of the filler is preferably 10 to 200 parts by mass, more preferably 20 to 100 parts by mass, with respect to 100 parts by mass of the rubber component.

Examples of the colorant include inorganic pigments such as titanium dioxide, zinc oxide, ultramarine, red iron oxide, lithopone, lead, cadmium, iron, cobalt, aluminum, hydrochloride and sulfate, and azo pigments, copper phthalocyanine pigments, and the like. The amount of the colorant is preferably from 0.1 to 10 parts by mass, and more preferably from 1 to 5 parts by mass, with respect to 100 parts by mass of the rubber component.

In the present invention, the other processing aid can be used as a rubber composition by kneading in a known rubber kneader, for example, a roll, a Banbury mixer, a kneader or the like, and vulcanizing under any conditions. The addition amount of these other processing aid can also be a conventional general blending amount as long as it does not contradict the purpose of the present invention.

[Method for Producing Rubber Composition]

The method for producing a rubber composition comprises a step of kneading a rubber component and an additive for rubber comprising the sulfur-containing unsaturated hydrocarbon polymer.

The method for producing the rubber composition may preferably further comprise a step of kneading the vulcanizing agent. More preferably, the method for producing the rubber composition may further comprise a step of kneading the vulcanizing agent and the vulcanization accelerator.

In the method for producing a rubber composition, the above-mentioned other processing aid can be appropriately mixed and kneaded to the extent that the function of the rubber composition is not impaired.

A conventionally known kneading apparatus can be used for producing the rubber composition, and the kneading temperature, time, mixing order, and the like can be appropriately selected.

[Tire]

Using the rubber composition of the present invention, tires can be manufactured according to the conventionally known methods and common technical knowledge widely known among those skilled in the art. For example, a rubber composition can be extruded, formed using a tire molding machine, and then heated and pressurized by means of a vulcanizing machine to form a cross-link, and as a result, a tire is produced. By manufacturing a tire using the rubber composition of the present invention, it is possible to improve wet grip performance and fuel efficiency in the tire performance in a good balance.

The use application of the tire is not particularly limited, and examples thereof include tires for passenger cars, tires for high load, tires for motorcycles, studless tires, and the like. Among these, it can be suitably used as a tire for passenger cars.

The shape, structure, size and material of the tire are not particularly limited, and can be appropriately selected according to the purpose. Further, the composition can be applied to each part of the tire, and the applying portion of the tire can be appropriately selected according to the purpose such as the tread, carcass, sidewall, inner liner, under tread, belt portion, and the like, without particular limitation.

[Rubber Product]

Rubber products other than tires can also be produced using the rubber composition of the present invention. Examples of the rubber products other than tires include automotive rubber parts (exterior, interior, weather strips, boots, mounts, seals, sealers, gaskets), hoses, belts, sheets, anti-vibration rubber, rollers, linings, rubber sheeting, sealants, gloves, fenders, medical rubber (syringe gaskets, tubes, catheters), gaskets (for home electronics and construction), asphalt modifiers, grips, toys, shoes, sandals, keypads, gears, PET bottle cap liners, and the like.

EXAMPLES

Although the present invention will be specifically described below with reference to the Examples and Comparative Examples, the present invention shall not be limited to these Examples.

Preparation Example 1

Synthesis of Sulfur-Containing Unsaturated Hydrocarbon Polymer A

To a 300 ml two-neck eggplant-shaped flask were added 50.00 g of petroleum resin A (Mw: 850, Mw/Mn: 1.95, softening point: 85° C., iodine value 178.4, double bond on norbornene skeleton 0.0998 mole/100 g DCPD/C9 resin) and 100.00 g of mesitylene as a solvent (186.05 mL, resin amount in solution: equivalent of 33 wt %) and allowed to stand for 30 minutes to half a day until the resin was completely dissolved. Next, 4.80 g of sulfur (0.150 mol, 3 equivalents per double bond on the norbornene skeleton in the resin) was added, and a stirrer bar, a reflux tube, and a ball plug were provided, and the inside was sufficiently replaced with nitrogen to make a nitrogen atmosphere. Then, in a state in which the system was stirred at about 300 rpm, the reaction was carried out by gradually increasing the temperature up to 160° C. in an oil bath. 7 hours after the temperature reached 160° C., the oil bath was removed, the mixture was allowed to stand at room temperature, and stirring was stopped. Thereafter, a red-brown reaction liquid was collected from the reactor. $^1$H-NMR analysis of the reaction liquid confirmed the consumption of double bonds on the norbornene skeleton at around 5.8 ppm.

Next, 1.15 kg of acetone and a stirrer bar were put into a 2-L beaker to make a strong stirring state. About 80 g of the obtained reaction liquid was added dropwise to the stirred liquid, and after the addition was completed, the stirring state was maintained for 5 minutes, and then stirring was stopped and the solid was collected by suction filtration. This series of steps from precipitation to filtration was repeated three times in each study to collect a solid for the total amount of the reaction liquid. The obtained solid was dried under reduced pressure at 0.1 kPa at 50° C. for about 4 to 8 hours to obtain 41.4 g of a brown powdery solid. As a result of $^1$H-NMR analysis on the obtained solid, consumption of the double bond on the norbornene skeleton near 5.8 ppm was reconfirmed. A $^1$H-NMR chart is shown in FIG. 1. As a result of GPC analysis, Mw: 4600 and Mw/Mn: 2.76 were obtained. From elemental analysis, the sulfur content was 8.9% by mass, and the introduction of 3.07 sulfur molecules per the amount of double bonds on the norbornene skeleton was confirmed.

Preparation Example 2

Synthesis of Sulfur-Containing Unsaturated Hydrocarbon Polymer B

To a 300 ml two-neck eggplant-shaped flask were added 50.00 g of petroleum resin B (Mw: 490, Mw/Mn: 2.34, softening point: 84° C., iodine value 137.3, double bond on norbornene skeleton 0.0814 mole/100 g DCPD/C9 resin) and 100.00 g of mesitylene (186.05 mL, resin amount in solution: equivalent of 33 wt %) as a solvent and allowed to stand for 30 minutes to half a day until the resin was completely dissolved. Next, 3.01 g of sulfur (0.122 mol, 3 equivalents per double bond on the norbornene skeleton in the resin) was added, and a stirrer bar, a reflux tube, and a ball plug were provided, and the inside was sufficiently replaced with nitrogen to make a nitrogen atmosphere. Then, in a state in which the system was stirred at about 300 rpm, the reaction was carried out by gradually increasing the temperature up to 160° C. in an oil bath. 7 hours after the temperature reached 160° C., the oil bath was removed, the mixture was allowed to stand at room temperature, and stirring was stopped. Thereafter, a red-brown reaction liquid was collected from the reactor. $^1$H-NMR analysis of the reaction liquid confirmed the consumption of double bonds on the norbornene skeleton at around 5.8 ppm.

Next, 1.15 kg of acetone and a stirrer bar were put into a 2 L beaker to make a state of strong stirring. About 80 g of the obtained reaction liquid was added dropwise to the stirred liquid, and after the addition was completed, the stirring state was maintained for 5 minutes, and then stirring was stopped and the solid was collected by suction filtration. This series of steps from precipitation to filtration was repeated three times in each study to collect the solid for the total amount of the reaction liquid. The obtained solid was dried under reduced pressure at 0.1 kPa at 50° C. for about 4 to 8 hours to obtain 18.9 g of a brown powdery solid. As a result of $^1$H-NMR analysis for the obtained solid, consumption of the double bond on the norbornene skeleton near 5.8 ppm was reconfirmed. As a result of GPC analysis, Mw: 1600 and Mw/Mn: 1.46 were obtained. From elemental analysis, the sulfur content was 9.5% by mass, and the introduction of 4.04 sulfur molecules per amount of double bonds on the norbornene skeleton was confirmed.

Preparation Example 3

Synthesis of Sulfur-Containing Unsaturated Hydrocarbon Polymer C

To a 300 ml two-neck eggplant-shaped flask were added 7.00 g of petroleum resin C (Mw: 716, Mw/Mn: 1.65, softening point: 103° C., iodine value 132.4, double bond on norbornene skeleton 0.1535 mole/100 g DCPD/C9 resin) and 14.00 g of aroma oil (product name: AROMAX T-DAE, manufactured by Nippon Oil Corporation) as a solvent (resin amount in solution: equivalent to 33 wt %) and allowed to stand for 30 minutes to half a day. Next, 1.03 g of sulfur (0.032 mol, 3 equivalents per double bond on the norbornene skeleton in the resin) was added, and a stirrer bar, a reflux tube, and a ball plug were provided, and the inside was sufficiently replaced with nitrogen to make a nitrogen atmosphere. Then, in a state in which the system was stirred at about 300 rpm, the reaction was carried out by gradually increasing the temperature up to 160° C. in an oil bath. 7 hours after the temperature reached 160° C., the oil bath was removed, the mixture was allowed to stand at room temperature, and the stirring was stopped. Thereafter, a red-brown reaction liquid was collected from the reactor. $^1$H-NMR analysis of the reaction liquid confirmed the consumption of double bonds on the norbornene skeleton at around 5.8 ppm. GPC analysis showed that Mw: 2,140 and Mw/Mn: 4.18.

Preparation Example 4

Synthesis of Sulfur-Containing Unsaturated Hydrocarbon Polymer D

To a 300 ml two-neck eggplant-shaped flask were added 50.00 g of petroleum resin A (Mw: 850, Mw/Mn: 1.95, softening point: 85° C., iodine value: 178.4, double bond on norbornene skeleton 0.0998 mole/100 g DCPD/C9 resin) and 100.00 g of petroleum resin D (Mw: 730, Mw/Mn: 1.52, softening point: 103° C., hydrogenated DCPD/C9 resin) as a solvent (resin amount in solution: equivalent to 33 wt %). Next, 4.80 g of sulfur (0.150 mol, 3 equivalents per double bond on the norbornene skeleton in the resin) was added, and a stirrer bar, a reflux tube, and a ball plug were provided, and the inside was sufficiently replaced with nitrogen to make a nitrogen atmosphere. Then, in a state in which the system was stirred at about 300 rpm, the reaction was carried out by gradually increasing the temperature up to 160° C. in an oil bath. 7 hours after the temperature reached 160° C., the oil bath was removed, the mixture was allowed to stand at room temperature, and stirring was stopped. Thereafter, a red-brown reaction liquid was collected from the reactor. $^1$H-NMR analysis of the reaction liquid confirmed the consumption of double bonds on the norbornene skeleton at around 5.8 ppm.

Preparation Example 5

Synthesis 2 of Sulfur-Containing Unsaturated Hydrocarbon Polymer B

To a 300 ml two-neck eggplant-shaped flask were charged 50.00 g of petroleum resin B (Mw: 490, Mw/Mn: 2.34, softening point: 84° C., iodine value 137.3, double bond on norbornene skeleton 0.0814 mole/100 g DCPD/C9 resin), and 100.00 g of T-DAE (resin amount in solution: equivalent to 33 wt %) as a solvent and allowed to stand for 30 minutes to half a day. Next, 3.01 g (0.122 mol, 3 equivalents per double bond on the norbornene skeleton in the resin) of sulfur was added, and a stirrer bar, a reflux tube, and a ball plug were provided, and the inside was sufficiently replaced with nitrogen to make a nitrogen atmosphere. Then, in a state in which the system was stirred at about 300 rpm, the reaction was carried out by gradually increasing the temperature up to 160° C. in an oil bath. 7 hours after the temperature reached 160° C., the oil bath was removed, the mixture was allowed to stand at room temperature, and stirring was stopped. Thereafter, a red-brown reaction liquid was collected from the reactor. $^1$H-NMR analysis of the reaction liquid confirmed the consumption of double bonds on the norbornene skeleton at around 5.8 ppm.

Example 1

The following components were kneaded by using a 100 mL kneader (Laboplast mill manufactured by Toyo Seiki Co., Ltd.) to obtain a rubber composition. The details of the kneading operation performed are as in the following (i) to (iii).

(i) Mixer kneading: Rubber was charged into a closed pressure kneader heated to 150° C., and kneading was carried out at 30 rpm for 1 minute, then ½ of the mixture of silica, zinc oxide, stearic acid and anti-aging agent was measured, and the total amount of the silane coupling agent and the total amount of the sulfur-containing unsaturated hydrocarbon polymer A were charged, and kneading was carried out for 1 minute and 30 seconds at a rotational speed increased to 50 rpm. The remaining ½ of the mixture of silica, zinc oxide, stearic acid and anti-aging agent is further added, and kneading is continued for 1 minute and 30 seconds, then by raising a ram (floating weight), powder of the mixture of silica, zinc oxide, stearic acid and anti-aging agent, which attached to the periphery of the mixture, was introduced into the kneaded product by using a brush, and after further kneading is continued for 1 minute, the ram was raised again to introduce the powder of the mixture of silica, zinc oxide, stearic acid and an anti-aging agent, which was attached to the periphery of the mixture, into the kneaded product by using a brush, and further kneading was carried out for 3 minutes and discharged.

(ii) Remill: In order to improve dispersion of silica, the kneaded product that was discharged into a closed pressure kneader heated to 120° C. to sufficiently lower the temperature was kneaded again at 50 rpm for 2 minutes, and then discharged.

(iii) Roll kneading (addition of vulcanizing system): After the temperature was sufficiently lowered by discharging, sulfur, a vulcanization accelerator and the like were added to the above-mentioned kneaded product by two rolls, thereby obtaining a rubber composition.

Thereafter, the obtained unvulcanized rubber composition was put into a mold (150 mm×150 mm×2 mm) and heated and pressurized at 150° C. for 25 minutes to obtain a vulcanized rubber sheet having a thickness of 2 mm.

| | |
|---|---|
| Rubber (SBR, manufactured by ZEON CORPORATION, product name: 1502) | 100 parts by mass |
| Silica AQ (manufactured by Tosoh Corporation, product name: Nip Seal AQ) | 60 parts by mass |
| Zinc Oxide No. 3 (manufactured by Toho Zinc Co., Ltd., product name: Ginrei R) | 3 parts by mass |
| Stearic Acid (manufactured by New Japan Chemical Co., Ltd., product name: Stearic acid 300) | 1 part by mass |
| Anti-aging agent (manufactured by Ouchi Shinko Chemical Industrial, product name: NOCRAC 6C) | 1 part by mass |
| Silane coupling agent (manufactured by Degussa, product name: Si69) | 4.8 parts by mass |
| Sulfur-containing unsaturated hydrocarbon polymer A | 5 parts by mass |
| Sulfur (manufactured by Hosoi Chemical Industry Co. Ltd., 5% oil-treated sulfur) | 2 parts by mass |
| Vulcanization accelerator (manufactured by Ouchi Shinko Chemical Industrial, product name: NOCCELER CZ) | 1 part by mass |
| Vulcanization accelerator (manufactured by Ouchi Shinko Chemical Industrial, product name: NOCCELER D) | 0.5 part by mass |

Example 2

A rubber composition and a vulcanized rubber sheet were obtained in the same manner as in Example 1, except that 5 parts by mass of Sulfur-containing unsaturated hydrocarbon polymer B was added instead of Sulfur-containing unsaturated hydrocarbon polymer A.

Comparative Example 1

A rubber composition and a vulcanized rubber sheet were obtained in the same manner as in Example 1 except that 5 parts by mass of aroma oil (product name: AROMAX T-DAE, manufactured by Nippon Oil Corporation) was added instead of Sulfur-containing unsaturated hydrocarbon polymer A.

Comparative Example 2

A rubber composition and a vulcanized rubber sheet were obtained in the same manner as in Example 1 except that 5 parts by mass of Petroleum resin C used in the synthesis of Sulfur-containing unsaturated hydrocarbon polymer C was added instead of Sulfur-containing unsaturated hydrocarbon polymer A.

Example 3

A rubber composition and a vulcanized rubber sheet were obtained in the same manner as in Example 1 except that 10 parts by mass of Sulfur-containing unsaturated hydrocarbon polymer A was added.

Example 4

A rubber composition and a vulcanized rubber sheet were obtained in the same manner as in Example 2 except that 10 parts by mass of Sulfur-containing unsaturated hydrocarbon polymer B was added.

Comparative Example 3

A rubber composition and a vulcanized rubber sheet were obtained in the same manner as in Comparative Example 1 except that 10 parts by mass of aroma oil (product name: Aromax T-DAE, manufactured by Nippon Oil Corporation) was added.

Comparative Example 4

A rubber composition and a vulcanized rubber sheet were obtained in the same manner as in Comparative Example 2 except that 10 parts by mass of Petroleum resin C was added.

Comparative Example 5

A rubber composition and a vulcanized rubber sheet were obtained in the same manner as in Example 1 except that 10 parts by mass of Petroleum resin A used for the synthesis of Sulfur-containing unsaturated hydrocarbon polymer A was added instead of Sulfur-containing unsaturated hydrocarbon polymer A.

Example 5

A rubber composition and a vulcanized rubber sheet were obtained in the same manner as in Example 1 except that 15 parts by mass of Sulfur-containing unsaturated hydrocarbon polymer C was added instead of Sulfur-containing unsaturated hydrocarbon polymer A.

Comparative Example 6

A rubber composition and a vulcanized rubber sheet were obtained in the same manner as in Example 1 except that 10 parts by mass of aroma oil (product name: AROMAX T-DAE, manufactured by Nippon Oil Corporation) and 5 parts by mass of Petroleum resin C were added instead of Sulfur-containing unsaturated hydrocarbon polymer A.

Example 6

A rubber composition and a vulcanized rubber sheet were obtained in the same manner as in Example 1 except that 15 parts by mass of Sulfur-containing unsaturated hydrocarbon polymer D was added instead of Sulfur-containing unsaturated hydrocarbon polymer A.

Comparative Example 7

A rubber composition and a vulcanized rubber sheet were obtained in the same manner as in Example 1 except that 5 parts by mass of Petroleum resin A and 10 parts by mass of Petroleum resin D were added in place of Sulfur-containing unsaturated hydrocarbon polymer A.

[Physical Property Evaluation]

The physical properties of the vulcanized rubber sheets obtained in Examples 1 to 6 and Comparative Examples 1 to 7 were evaluated by the following method.

(Hardness)

Three vulcanized rubber sheets (thickness: 2 mm) obtained in Examples 1 to 6 and Comparative Examples 1 to

16 balance (=tan δ (0° C.)/tan δ (60° C.) was calculated from these values. The higher the tan δ (0° C.) indicates the better wet grip property performance, and the lower the tan δ (60° C.) indicates better fuel efficiency. For this reason, tan δ balance (=tan δ (0° C.)/tan δ (60° C.)) is a relative index between wet grip performance and fuel efficiency.

(Tensile Strength)

A #3 dumbbell-shaped test piece was punched out from the vulcanized rubber sheets obtained in Examples 1 to 6 and Comparative Examples 1 to 7, a tensile test at a tensile speed of 500 mm/min was conducted in accordance with JIS K6251 (published in 2010), and 100% modulus [MPa] and 300% modulus [MPa] were measured at room temperature (25° C.). It is shown that the higher the 100% modulus and 300% modulus are, the better the tensile strength is.

The above measurement results and calculation results (tan δ balance) are shown in Table 1. Examples 1 and 2 and Comparative Example 2 are described as relative values when the values in Comparative Example 1 are set to 100, Examples 3 and 4 and Comparative Examples 4 and 5 are described as relative values when the values in Comparative Example 3 are set to 100, and Example 5 is described as a relative value when the value in Comparative Example 6 is set to 100.

TABLE 1

| | | Comp Ex. 1 | Comp Ex. 2 | Ex. 1 | Ex. 2 | Comp Ex. 3 | Comp Ex. 4 | Comp Ex. 5 | Ex. 3 | Ex. 4 | Comp Ex. 6 | Ex. 5 | Comp Ex. 7 | Ex. 6 |
|---|---|---|---|---|---|---|---|---|---|---|---|---|---|---|
| Composition of Rubber Composition (psrts by mass) | Rubber | 100 | 100 | 100 | 100 | 100 | 100 | 100 | 100 | 100 | 100 | 100 | 100 | 100 |
| | Silica AQ | 60 | 60 | 60 | 60 | 60 | 60 | 60 | 60 | 60 | 60 | 60 | 60 | 60 |
| | Zinc Oxide No. 3 | 3 | 3 | 3 | 3 | 3 | 3 | 3 | 3 | 3 | 3 | 3 | 3 | 3 |
| | Stearic Acid | 1 | 1 | 1 | 1 | 1 | 1 | 1 | 1 | 1 | 1 | 1 | 1 | 1 |
| | Anti-aging agent (NOCRAC 6C) | 1 | 1 | 1 | 1 | 1 | 1 | 1 | 1 | 1 | 1 | 1 | 1 | 1 |
| | Silane Coupling Agent (Si69) | 4.8 | 4.8 | 4.8 | 4.8 | 4.8 | 4.8 | 4.8 | 4.8 | 4.8 | 4.8 | 4.8 | 4.8 | 4.8 |
| | Aroma Oil (AROMAX T-DAE) | 5 | 0 | 0 | 0 | 10 | 0 | 0 | 0 | 0 | 10 | 0 | 0 | 0 |
| | Petroleum Resin C | 0 | 5 | 0 | 0 | 0 | 10 | 0 | 0 | 0 | 5 | 0 | 0 | 0 |
| | Petroleum Resin A | 0 | 0 | 0 | 0 | 0 | 0 | 10 | 0 | 0 | 0 | 0 | 5 | 0 |
| | Petroleum Resin D | 0 | 0 | 0 | 0 | 0 | 0 | 0 | 0 | 0 | 0 | 0 | 10 | 0 |
| | Sulfur-containing unsaturated hydrocarbon polymer A | 0 | 0 | 5 | 0 | 0 | 0 | 0 | 10 | 0 | 0 | 0 | 0 | 0 |
| | Sulfur-containing unsaturated hydrocarbon polymer B | 0 | 0 | 0 | 5 | 0 | 0 | 0 | 0 | 10 | 0 | 0 | 0 | 0 |
| | Sulfur-containing unsaturated hydrocarbon polymer C | 0 | 0 | 0 | 0 | 0 | 0 | 0 | 0 | 0 | 0 | 15 | 0 | 0 |
| | Sulfur-containing unsaturated hydrocarbon polymer D | 0 | 0 | 0 | 0 | 0 | 0 | 0 | 0 | 0 | 0 | 0 | 0 | 15 |
| | Vulcanizing agent (Sulfur) | 2 | 2 | 2 | 2 | 2 | 2 | 2 | 2 | 2 | 2 | 2 | 2 | 2 |
| | Vulcanization accelerator (NOCCELER CZ) | 1 | 1 | 1 | 1 | 1 | 1 | 1 | 1 | 1 | 1 | 1 | 1 | 1 |
| | Vulcanization accelerator (NOCCELER D) | 0.5 | 0.5 | 0.5 | 0.5 | 0.5 | 0.5 | 0.5 | 0.5 | 0.5 | 0.5 | 0.5 | 0.5 | 0.5 |
| Hardness | JIS-A Hardness | 72 | 70 | 70 | 69 | 63 | 68 | 69 | 71 | 68 | 62 | 61 | 61 | 62 |
| Tensile Strength | 100% Modulus (Index) | 2.0 | 1.9 | 2.3 | 2.3 | 1.9 | 1.8 | 2.2 | 2.9 | 2.7 | 1.5 | 2.1 | 1.7 | 2.2 |
| | 300% Modulus (Index) | 7.0 | 7.4 | 8.8 | 9.2 | 9.4 | 7.0 | 10.9 | 17.4 | 17.7 | 6.3 | 10.8 | 6.9 | 9.9 |
| Viscoelastic Property | Tan δ (0° C.) (Index) (%) | 100 | 122 | 123 | 135 | 100 | 129 | 128 | 134 | 166 | 100 | 102 | 100 | 104 |
| | Tan δ (60° C.) (Index) (%) | 100 | 118 | 114 | 112 | 100 | 118 | 117 | 102 | 100 | 100 | 90 | 100 | 89 |
| | tanδ(0° C.)/tanδ(60° C.) (Index) (%) | 100 | 104 | 107 | 120 | 100 | 109 | 109 | 132 | 167 | 100 | 113 | 100 | 117 |

7 were stacked, and JIS-A strength was measured in accordance with JIS K6353 (published in 2012).

(Viscoelastic Properties)

With respect to the vulcanized rubber sheets obtained in Examples 1 to 6 and Comparative Examples 1 to 7, tan δ at measurement temperatures of 0° C. and 60° C. was determined in accordance with JIS K 6394 under conditions of deformation of about 0.1% and frequency of 10 Hz in a tensile mode by using a viscoelasticity measuring device (REOGEL E-4000 manufactured by UBM), and a tan δ

In comparison with Comparative Examples 1 and 2 in which an aroma oil or a petroleum resin was added instead of a sulfur-containing unsaturated hydrocarbon polymer, the results of Examples 1 and 2 show that tan δ (0° C.) as an index of wet grip performance is higher, tan δ balance as a relative index of fuel efficiency and wet grip performance is higher, and tensile strength (100% modulus, 300% modulus) as an index of cut chip resistance is higher.

In comparison with Comparative Examples 3 to 5 in which an aroma oil or petroleum resins were added instead of of a sulfur-containing unsaturated hydrocarbon polymer, the results of Examples 3 and 4 show that tan δ (0° C.) as an index of wet grip performance is higher, tan δ balance as a relative index of fuel efficiency and wet grip performance is higher, and tensile strength (100% modulus, 300% modulus) as an index of cut chip resistance is higher.

In comparison with Comparative Example 6 in which an aroma oil and a petroleum resin were added instead of a sulfur-containing unsaturated hydrocarbon polymer, the result of Example 5 shows that tan δ (0° C.) as an index of wet grip performance is higher, tan δ balance as a relative index of fuel efficiency and wet grip performance is higher, and tensile strength (100% modulus, 300% modulus) as an index of cut chip resistance is higher.

In comparison with Comparative Example 7 in which Petroleum resin A and Petroleum resin D (hydrogenated DCPD/C9 resin) were added instead of a sulfur-containing unsaturated hydrocarbon polymer, the result of Example 6 shows that tan δ (0° C.) as an index of wet grip performance was higher, tan δ balance as a relative index of fuel efficiency and wet grip performance was higher, and tensile strength (100% modulus, 300% modulus) as an index of cut chip resistance was higher.

Therefore, it has been found that by adding the sulfur-containing unsaturated hydrocarbon polymer of the present invention to the rubber composition, it is possible to produce a tire having a good balance of wet grip performance and fuel efficiency in practice.

The invention claimed is:

1. A method for producing a rubber composition comprising a step of combining a sulfur-containing unsaturated hydrocarbon polymer and a rubber component and a step of kneading the sulfur-containing unsaturated hydrocarbon polymer and the rubber component, wherein the sulfur-containing unsaturated hydrocarbon polymer is a reaction product obtained by reacting sulfur with an unsaturated bond of a polymer of an unsaturated hydrocarbon, the reaction product is composed only of sulfur and the polymer of the unsaturated hydrocarbon, the polymer of the unsaturated hydrocarbon is a petroleum resin comprising a norbornene skeleton, and the amount of sulfur reacted with the petroleum resin is 0.3 to 5 equivalent per unsaturated bond of the petroleum resin.

2. The method of claim 1, wherein the unsaturated hydrocarbon comprises a dicyclopentadiene.

3. The method of claim 2, wherein the petroleum resin is a DCPD/C9 resin.

4. The method of claim 3, wherein the rubber component comprises a diene rubber.

5. The method of claim 1, wherein the petroleum resin is a DCPD/C9 resin.

6. The method of claim 5, wherein the rubber component comprises a diene rubber.

7. The method of claim 1, wherein the rubber component comprises a diene rubber.

8. A tire produced with the rubber composition obtained by the method of claim 1.

9. A tire produced with the rubber composition obtained by the method of claim 2.

10. A tire produced with the rubber composition obtained by the method of claim 3.

11. A tire produced with the rubber composition obtained by the method of claim 4.

12. A tire produced with the rubber composition obtained by the method of claim 5.

13. A tire produced with the rubber composition obtained by the method of claim 6.

14. A tire produced with the rubber composition obtained by the method of claim 7.

* * * * *